United States Patent [19]
Ono et al.

[11] Patent Number: 5,921,273
[45] Date of Patent: Jul. 13, 1999

[54] DELIVERY VALVE ASSEMBLY FOR COMPRESSOR

[75] Inventors: Mitsuya Ono; Katsumi Sakamoto; Nobuyuki Nakajima; Toshihiro Murayama; Shunji Muta; Tomoyasu Takahashi; Susumu Makihira, all of Konan, Japan

[73] Assignee: Zexel Corporation, Tokyo, Japan

[21] Appl. No.: 08/834,592

[22] Filed: Apr. 7, 1997

[30] Foreign Application Priority Data

Apr. 8, 1996 [JP] Japan .................................. 8-111296

[51] Int. Cl.⁶ .................................................. F16K 15/16
[52] U.S. Cl. ........................ 137/454.4; 137/853; 137/856; 417/559
[58] Field of Search .................. 137/853, 454.4, 137/856; 417/559

[56] References Cited

U.S. PATENT DOCUMENTS 4,127,369  11/1978  Eiermann et al. ................... 137/856 X
4,199,309  4/1980  Connor .............................. 137/856 X

FOREIGN PATENT DOCUMENTS 2 756 386  6/1979  Germany ............................... 417/559

Primary Examiner—Stephen M. Hepperle
Attorney, Agent, or Firm—Wenderoth, Lind & Ponack, L.L.P.

[57] ABSTRACT

A a cartridge type delivery valve assembly in which a valve seat surface and a valve are integrated in order to assure good seating characteristics in the delivery valve. The delivery valve assembly is formed by fixing together a valve holder provided with delivery holes, a roll valve that is mounted along the internal surface of the valve holder to freely open and close the delivery holes and a valve stopper that fixes the roll valve onto the valve holder and regulates the lift quantity of the roll valve, in an integrated manner using coupling members and the delivery valve assembly thus achieved is mounted in a valve insertion space.

18 Claims, 7 Drawing Sheets

DELIVERY VALVE ASSEMBLY FOR COMPRESSOR

BACKGROUND OF THE INVENTION

1. Field of the Invention

The present invention relates to a delivery valve used in a compressor provided with a cylindrically shaped valve insertion space formed at a cylinder that partitions a compression space that communicates with the valve insertion space delivery ports and that also communicates with a delivery opening.

2. Description of the Related Art

Delivery valves in the prior art include the delivery valve used in a rotary compressor disclosed in Japanese Unexamined Utility Model Publication No. S56-109472, which is inserted in a round delivery hole that extends at a right angle to a plurality of delivery openings for discharging high pressure gas from the compression space, and is secured by a cylindrically shaped valve-holding fixture and a fastening member such as a rivet.

In addition, the delivery valve used in a movable vane type compressor disclosed in Japanese Unexamined Patent Publication No. S58-148293 is mounted within a cylindrically shaped delivery passage provided in a plurality of holes that pass through the external wall of the cylinder of the movable vane type compressor in the direction of the shaft while, at the same time, communicating with the compression space of the movable vane type compressor. It is held at both ends by a valve holder and it bends in an arc along the internal circumferential surfaces of the cylindrically shaped delivery passage to open and close the plurality of holes freely.

Moreover, the delivery valve used in a vane compressor disclosed in Japanese Unexamined Utility Model Publication No. S59-86389, is inserted into a rectangular parallelopiped delivery passage and is clamped and secured to the internal wall of the delivery passage by a retainer. The retainer holds and secures the delivery valve in close contact with the internal wall of the delivery passage, and is provided with lift restricting portions that restrict the lift quantity of the delivery valve.

Furthermore, the delivery valve used in a rotary compressor disclosed in Japanese Examined Utility Model Publication No. H7-8861 is housed within a valve chamber which is shaped roughly as a rectangular parallelopiped and is clamped and secured to the internal wall of the valve chamber by a valve holder. This valve holder comprises restricting portions that restrict the lift quantity of the delivery valve and a back plate that is inserted through a pair of grooved portions at the ends of the valve chamber, and the valve holder and the delivery valve are secured to each other by such means as screws.

However, in each of the examples cited above, the delivery valve is directly mounted in a valve chamber or in a valve insertion space formed at the cylinder, and thus the delivery valve directly opens and closes the delivery holes which open at the delivery chamber or the valve insertion space. As a result, a problem arises in that, due to the vibration of the delivery valve and the contact with the valve, the cylinder internal wall and, in particular, the seat surface, become deformed or damaged. If this happens, even if the delivery valve is replaced, the reliability of the seating characteristics of the delivery valve cannot be assured since the seat surface itself is deformed.

SUMMARY OF THE INVENTION

An object of the present invention is to provide a cartridge type delivery valve assembly in which the valve seat surface and the valve are incorporated as a unit in order to assure the seating characteristics of the delivery valve.

Accordingly, the delivery valve assembly according to the present invention which is provided in a compressor having a cylindrically formed valve insertion space at a cylinder partitioning a compression space with the valve insertion space communicating with the compression space delivery ports and also communicating with delivery openings. The delivery valve assembly comprises a valve holder that is formed so as to have approximately the same shape as the valve insertion space and is provided with delivery holes which communicate with the delivery ports. A roll valve is provided along the internal circumference of the valve holder to freely open and close the delivery holes of the valve holder. A valve stopper is constituted with a fixing portion that bends to approximately the same shape as that to which the internal circumferential surface of the valve holder bends to clamp and secure the roll valve between itself and the valve holder. Also provided are restricting portions that extend from the fixing portion and restrict the lift quantity of the roll valve and linking members that secure the valve holder, the roll valve and the valve stopper at a specific position.

Consequently, according to the present invention, since the delivery valve assembly is formed by securing together the valve holder provided with the delivery holes, the roll valve, which is mounted along the internal surface of the valve holder to open and close the delivery holes freely, and the valve stopper, which secures the roll valve onto the valve holder and regulates the lift quantity of the roll valve, together in an integrated manner with coupling members and the resulting delivery valve assembly is inserted in the valve insertion space, the delivery valve assembly can be inserted into and taken out of the valve insertion space freely, achieving the object described above. In addition, since the portion where the roll valve sits is replaced when replacing the delivery valve assembly, as well as the roll valve, the seating characteristics of the roll valve can be assured. Furthermore, a spring property that works in the direction of the radius may be imparted to the valve holder to achieve an improvement in the adhesion between the valve holder and the internal wall of the valve insertion space.

Moreover, according to the present invention, the coupling members are provided with projected portions that project out from the external circumferential side surface of the valve holder in the direction of the radius, with a grooved portion, into which the projected portions are fitted formed in the internal wall of the valve insertion space.

With this, since the position of the delivery valve assembly relative to the delivery ports can be fixed by fitting the projected portions of the delivery valve assembly into the grooved portion formed in the valve insertion space, the mountability of the delivery valve assembly can be improved. Furthermore, self-rotation of the delivery valve assembly itself, caused by the delivered gas, can be prevented, thus achieving the object described above.

In addition, according to the present invention, the lift supporting point, which is the lift start point for the roll valve, and the coupling point, at which the coupling members link the valve holder, the roll valve and the valve stopper, are positioned on different sides relative to the portion that faces opposite the delivery holes of the valve holder in the direction of the radius.

Since this ensures that the roll valve is secured from the coupling point where it is fixed by the coupling members up to the lift supporting point beyond the portion that faces opposite the delivery holes in the direction of the radius, the delivery pressure applied to the valve stopper can be prevented from affecting the coupling point directly, achieving the object described above.

Furthermore, according to the present invention, coupling member retaining seats, that project out cylindrically toward the outside of the valve holder from the circumferential edges of the through holes of the valve holder, are formed at the circumferential edge of through holes, through which the coupling members pass.

Thus, since the coupling member retaining seats are placed in contact with the end portion of the mounting groove, the holding force against self-rotation provided by the projected portions of the coupling members is reinforced.

BRIEF DESCRIPTION OF THE INVENTION

The above and other features of the invention and the concomitant advantages will be better understood and appreciated by persons skilled in the field to which the invention pertains in view of the following description given in conjunction with the accompanying drawings which illustrate preferred embodiments. In the drawings.

DETAILED DESCRIPTION OF THE PREFERRED EMBODIMENTS

The following is an explanation of the embodiments of the present invention with reference to the drawings.

Figure 1:
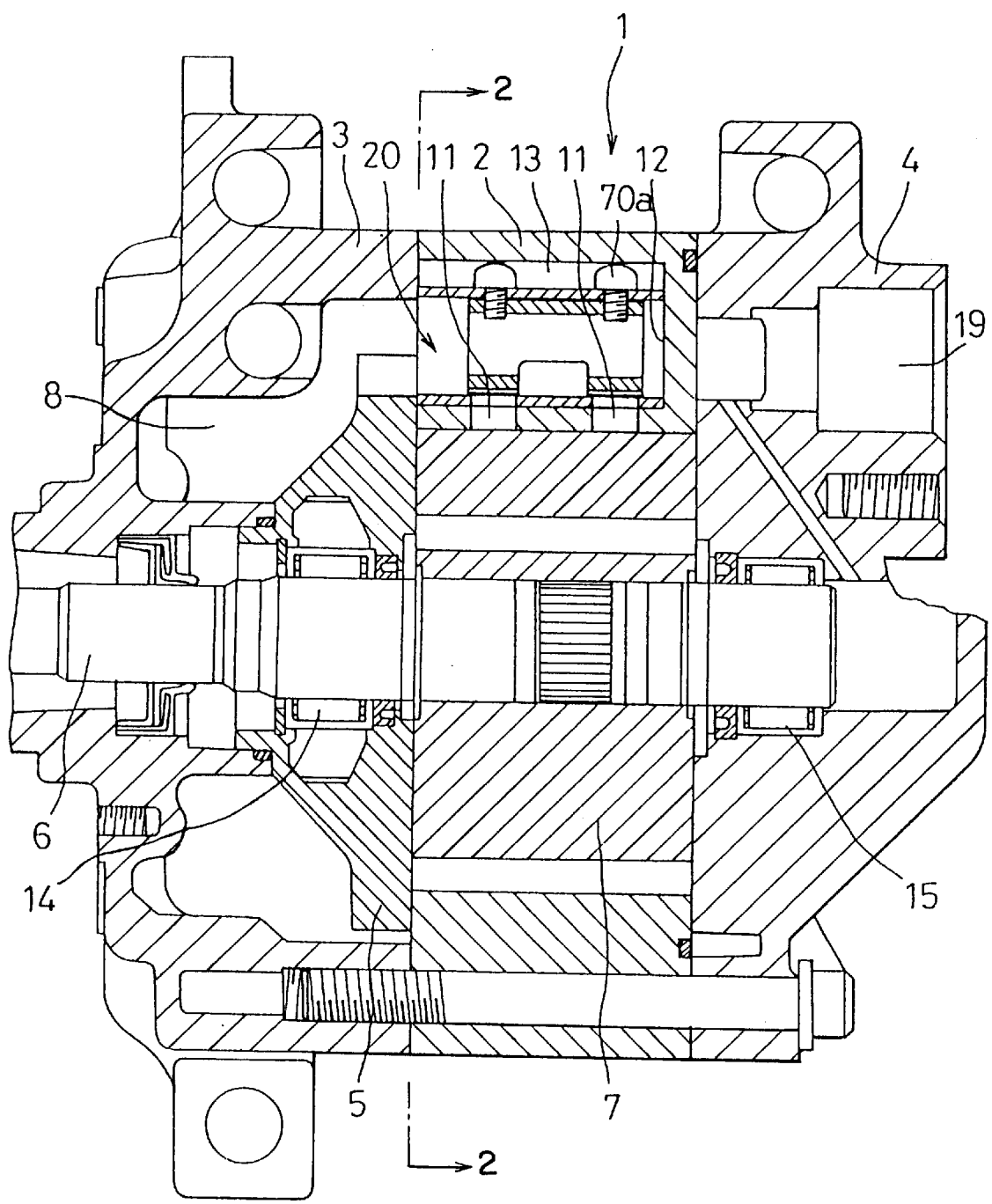
FIG. 1 is a cross sectional view taken along line 1—1 in FIG. 2 and shows a rotary vane compressor which is one example of a compressor in which the delivery valve assembly according to the present invention may be mounted.
Figure 2:
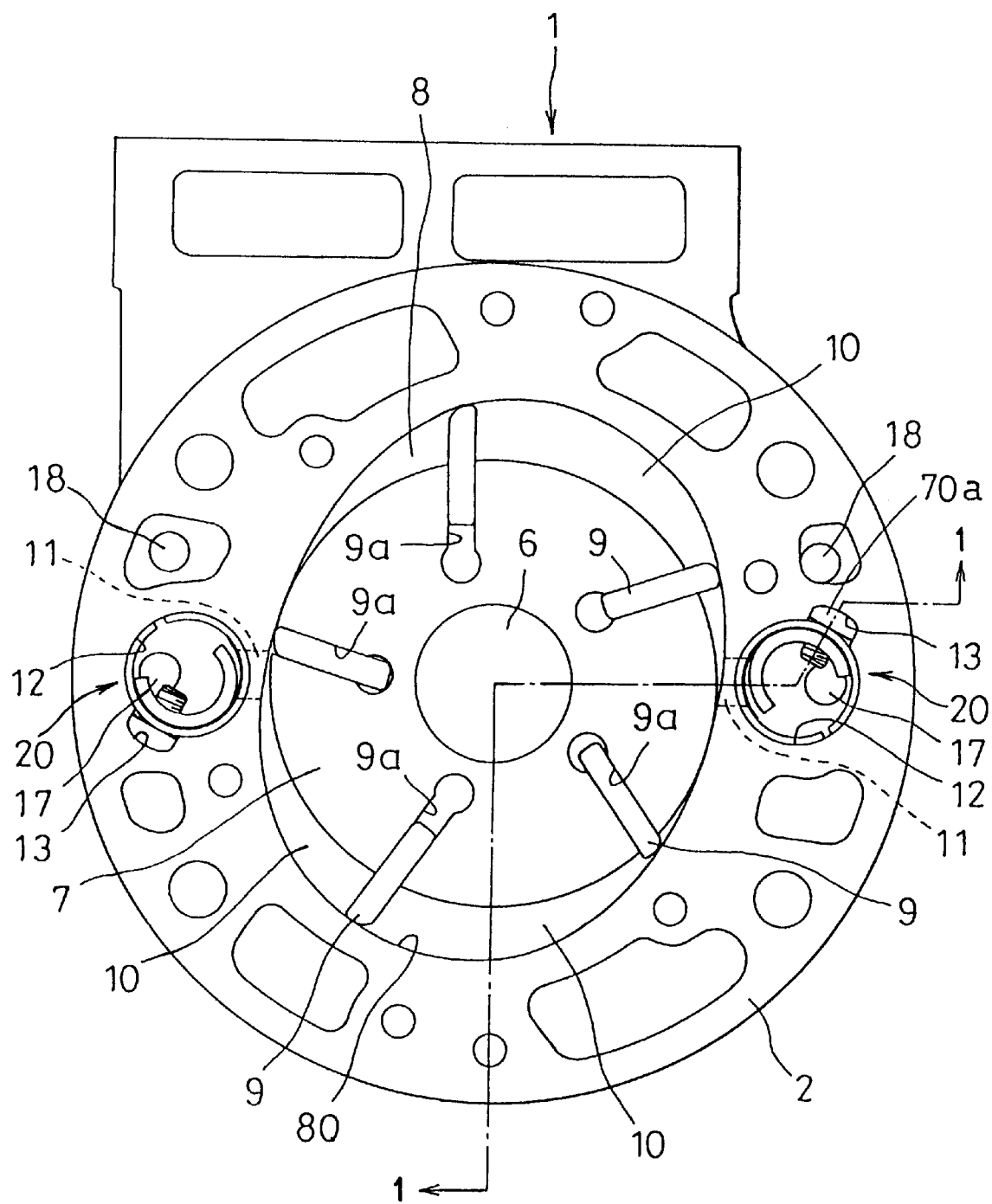
FIG. 2 is a cross sectional view taken along line 2—2 in FIG. 1 and shows the rotary vane compressor which is one example of a compressor in which the delivery valve assembly according to the present invention may be mounted.

A compressor in which the delivery valve assembly according to the present invention is mounted may be, for instance, the rotary vane compressor shown in FIGS. 1 and 2, although no restrictions whatsoever are imposed upon the type of compressor as long as it is provided with a cylindrical delivery space formed vertically to the delivery ports in a compression space provided within the cylinder which partitions the compression space of the compressor. This rotary vane compressor 1 is provided with a cylinder block 2 in which a roughly oval shaped through space 80 is formed. At one side of the cylinder block 2, a front side block 5 and a front head 3 are secured and at the other side, a rear head 4 is secured, so that the through space 80 can be closed off from both sides. In addition, a cylindrically shaped rotor 7 is provided inside the cylinder block 2, and this rotor 7 is secured onto a drive shaft 6 which is supported at the shaft by bearings 14 and 15 on the front side block and the rear head 4 to divide the internal space of the cylinder block 2 into two symmetrical spaces.

In addition, at the rotor 7, a plurality of vane grooves 9a (5 vane grooves in this embodiment) are formed in a roughly radial direction and vanes 9 are slidably inserted in the vane grooves 9a. Since a force is applied to the vanes 9 by the high delivery pressure supplied to the vane grooves 9a toward the outside in the direction of the radius, external ends of the vanes 9 are placed in contact with the internal circumferential surface of the cylinder block 2. The external ends of the vanes 9 move while maintaining contact with the internal circumferential surface of the cylinder block 2 as the rotor 7 rotates. Also, a compression space 10 within the cylinder block 2, the front side block 5 and the rear head 4 is partitioned by the rotor 7, and the adjacent vanes 9, and moves and changes its volumetric capacity as the rotor 7 rotates to perform intake and compression.

In the compressor 1, an intake opening 19 is formed at the rear head 4 and this intake opening 19 communicates with the compression space 10 via an intake port (not shown) which communicates with the through space 80. This causes a compressed substance (for instance, a coolant) to be taken into the compression space 10 from the intake opening 19 during the expansion phase of the compression space 10.

In addition, a high pressure space 8, which is made to communicate with the compression space 10 via delivery ports 11 and a valve insertion space 12 is formed at the front head 3. This causes the coolant which has been delivered through the delivery ports 11 during the contraction phase of the compression space 10 to be delivered through a delivery opening (not shown) via the high pressure space 8 and into a subsequent process.

The delivery ports 11 are formed at positions at which the volumetric capacity of the compression space 10 is at its minimum, and they communicate between the valve insertion space 12 and the through space 80. In addition, the valve insertion space 12, which is formed cylindrically perpendicular to the delivery ports 11, opens into the high pressure space 8 at the front head 3 side and is made to communicate with the high pressure space 8 via an opening portion 17 and a bypass hole 18 at the rear head 5 side. A mounting groove 13, in which projected portions 70a of the delivery valve assembly 20 are fitted, is formed in the valve insertion space 12 at a position that is offset from a position that faces opposite the delivery ports 11 in the circumferential direction, along the mounting direction of the delivery valve assembly 20.

Figure 3A:
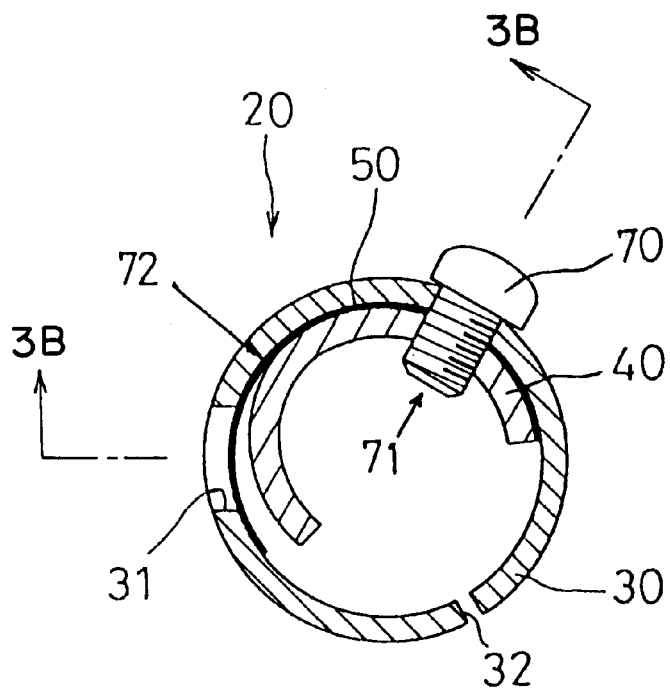
FIG. 3A shows the delivery valve assembly according to a first embodiment and is a cross sectional view taken along line 3A—3A in FIG. 3B
Figure 3B:
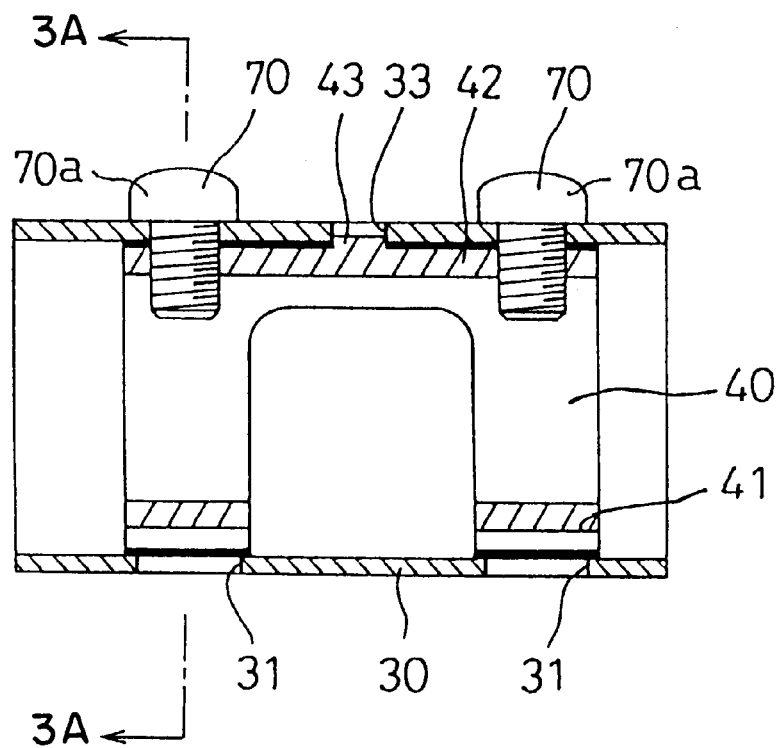
FIG. 3B shows the delivery valve assembly in the first embodiment and is a cross sectional view taken along line 3B—3B in FIG. 3A.

The delivery valve assembly 20, which is shown in FIGS. 3A and 3B, includes a valve holder 30, a valve stopper 40, a roll valve 50 and coupling members 70. In particular, the coupling members 70 are provided with heads 70a constituted of the projected portions of screws, bolts, rivets or the like, and link the valve holder 30, the valve stopper 40 and the roll valve 50 in a specific position. In this embodiment, screws are used to constitute the means for coupling 70.

Figure 4A:
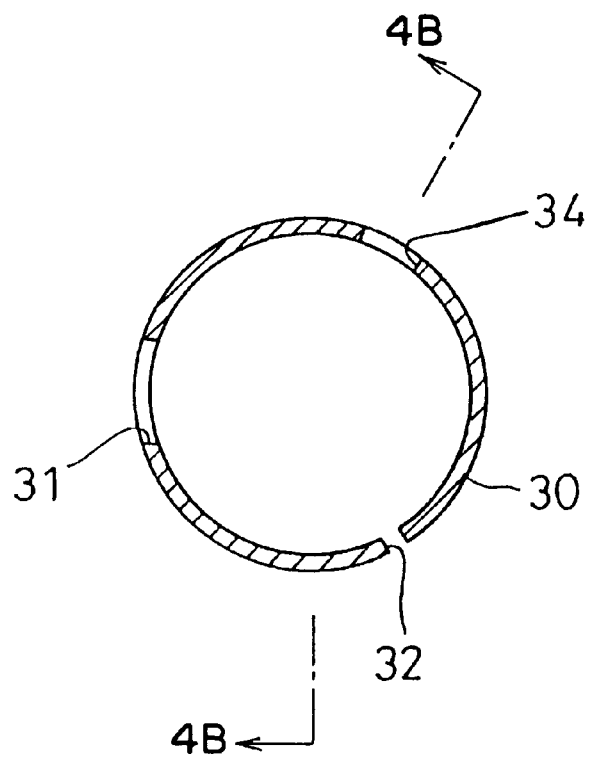
FIG. 4A shows the valve holder of the delivery valve assembly in the first embodiment and is a cross sectional view taken along line 4A—4A in FIG. 4B.
Figure 4B:
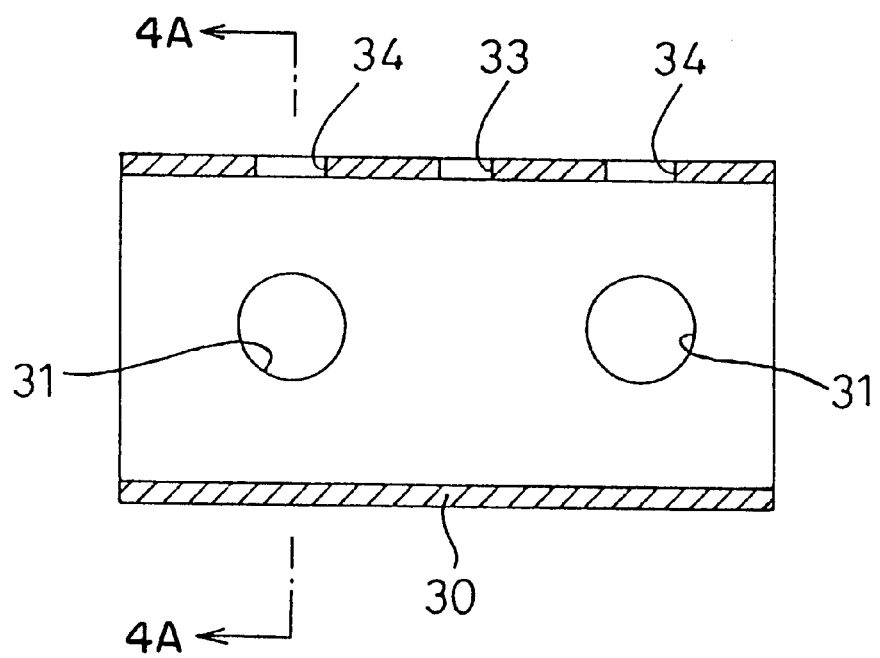
FIG. 4B shows the valve holder of the delivery valve assembly in the first embodiment and is a cross sectional view taken along line 4B—4B in FIG. 4A.

The valve holder 30, which is shown in FIGS. 4A and 4B, is formed by bending a single plate to achieve a cylindrical shape that is almost identical to the shape of the valve insertion space 12, and a specific dimension is set for a gap portion 32, over which two ends of the plate face opposite each other. This gap makes it possible to compress the valve holder 30 into a stressed state so that when it is mounted in the valve insertion space 12, it applies a force toward the outside in the direction of the radius due to the restoring force against the stress. In addition, the valve holder 30 includes delivery holes 31, which communicate with the delivery ports 11 when the delivery valve assembly 20 is mounted in the valve insertion space 12. Also, at a position which is offset from the position facing opposite the delivery holes 31 in the circumferential direction, a pair of through holes 34 are formed, through which the screws or the like constituting the coupling members 70 may be inserted. Also at this position, a fitting hole 33 is formed, into which a retaining projection 43 at the valve stopper 40 is fitted.

Figure 5A:
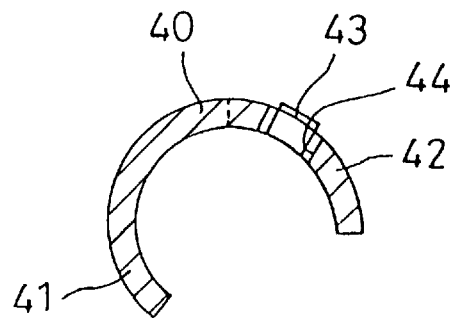
FIG. 5A shows the valve stopper of the delivery valve assembly in the first embodiment and is a cross sectional view taken along line 5A—5A in FIG. 5B.
Figure 5B:
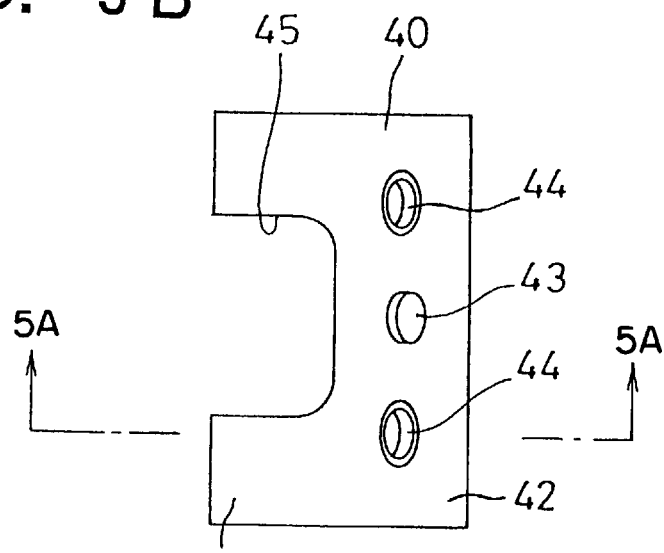
FIG. 5B is a perspective of the valve stopper of the delivery valve assembly of the first embodiment and FIG. 5C is its development diagram.
Figure 5C:
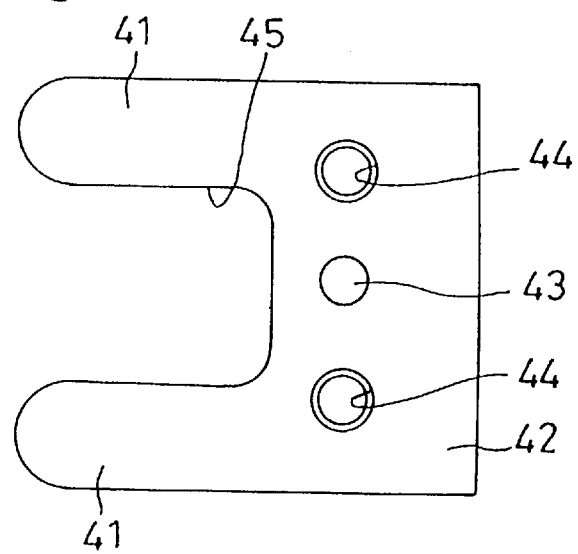

The valve stopper 40, which shown in FIGS. 5A, 5B and 5C, is includes a fixing portion 42 that bends and has a radius that is approximately equal to that of the internal surface of the valve holder 30 and lift restricting portions 41 that extend from the two ends of the fixing portion 42 to form a notch portion 45. The lift restriction portions 41 have a larger radius than the radius of the fixing portion 42. At the fixing portion 42, a pair of fixing holes 44, inside of which screw threads are provided to interlock with the screws constituting the coupling members 70, and a retaining projection 43 that projects out between the pair of fixing holes 44 are formed. The lift restricting portions 41 come in contact with the valve portions 51 of the roll valve 50, which is to be described in detail below, during lift. The lift quantity of the valve portions 51 is restricted in conformance to the distance between the lift restricting portions 41 and the delivery holes 31. By adjusting the lift quantity, it is possible to adjust the balance between the response characteristics of the roll valve 50 and the delivery resistance of the compressed substance. It is to be noted that if rivets are used to constitute the coupling members, it is not necessary to provide the threads in the fixing holes 44.

Figure 6:
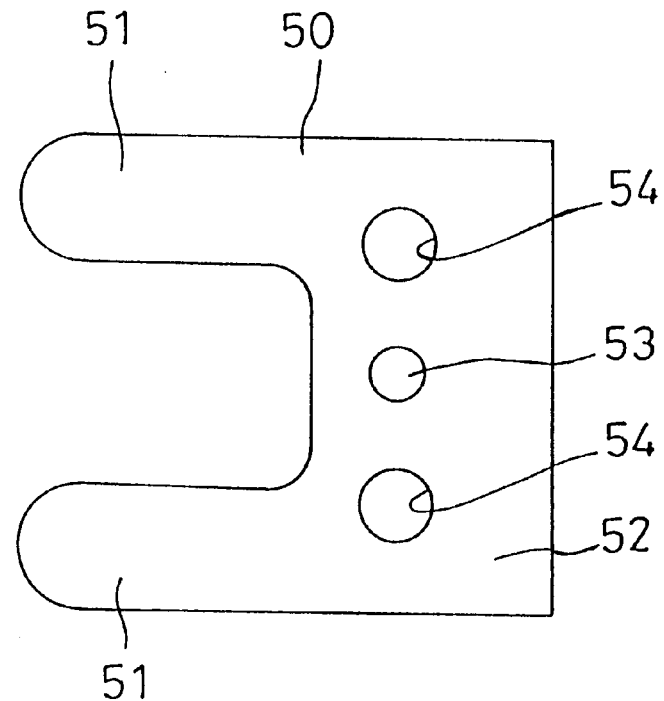
FIG. 6 is a development diagram of the roll valve of the delivery valve assembly of the first embodiment.

The roll valve 50, which is shown in FIG. 6, is formed so as to have a shape that is approximately the same as that of the valve stopper 40, using an elastic material such as copper, a spring steel, synthetic resin or the like. The roll valve includes a fixing portion 52, which is clamped and fixed between the valve stopper 40 and the valve holder 30, and valve portions 51, which freely open and close the delivery holes of the valve holder 30. Through holes 54, through which the coupling members 70 pass, are formed in the fixing portion 52. Also, a fitting hole 53, into which the retaining projection 43 is fitted, is formed in the fixing portion 52.

Thus, in order to assemble the delivery valve assembly 20, first a temporary assembly of the valve stopper 40 and the roll valve 50 is obtained by fitting the retaining projection 43 of the valve stopper 40 into the fitting hole 53 of the roll valve 50. Then, the valve stopper 40 and the roll valve 50 are inserted into the valve holder 30 with the retaining projection 50 of the valve stopper 40 fitted into the fitting hole 33 of the valve holder 30 to obtain a temporary assembly of the temporarily assembled valve stopper 40 and roll valve 50, and the valve holder 30. Lastly, the three members are fixed together with the screws that constitute the coupling members 70 and the assembly of the delivery valve assembly 20 is completed.

The delivery valve assembly 20 is then inserted in the valve insertion space 12 by compressing the valve holder 30 into a stressed state and then by inserting the projected portions 70A (screw heads) of the coupling members 70 into the mounting groove 13. Next, by releasing the stress on the valve holder 30, the mounting of the delivery valve assembly 20 into the valve insertion space 12 is completed.

As has been explained, since the delivery valve assembly 20 in which the roll valve 50 and the delivery holes 31, which are freely opened and closed by the roll valve 50, are formed in an integrated manner, when the valve assembly is mounted in the valve insertion space 12, the internal wall of the valve insertion space 12 is prevented from becoming damaged by the opening/closing of the roll valve 50. At the same time, the mounting of the delivery valve assembly 20 into the valve insertion space 12 is facilitated. Furthermore, by fitting the projected portions 70a of the delivery valve assembly 20 into the mounting groove 13, self-rotation of the delivery valve assembly 20 is prevented.

Moreover, in the embodiment described above (the first embodiment), the position of the coupling point 71 of the coupling achieved by the coupling members 70 is offset toward the delivery holes 31 by a specific value relative to the position that faces opposite the delivery holes 31 at the valve holder 30 (hereafter referred to as the apex of the valve holder 30), and the length of the arc extending from the delivery holes 31 to the coupling point 71 is set at or less than 180 degrees from the delivery holes 31. This setting ensures that the lift supporting point 72 of the roll valve 50, which approximately matches the portion of the valve stopper 40 where it shifts from the fixing portion 41 to the lift restricting portions 42, is set at approximately half way between the delivery holes 31 and the coupling point 71. This is relatively close to the delivery holes 31 and improves the operability (opening/closing response) of the roll valve 50.

Figure 7:
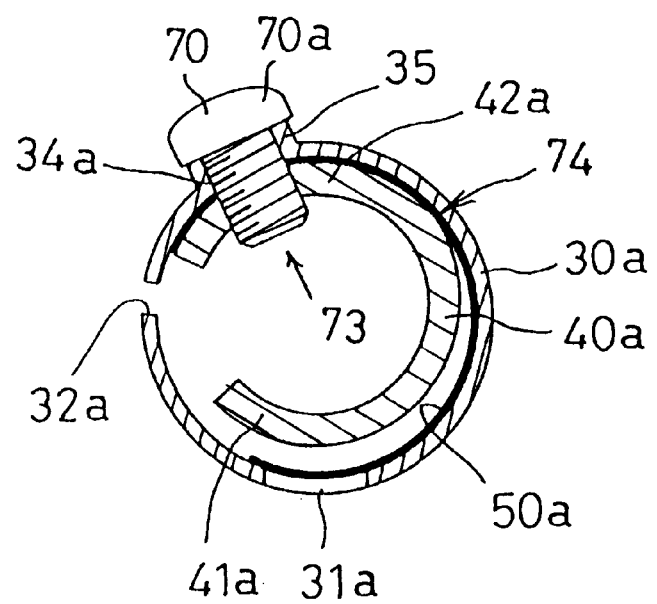
FIG. 7 is a cross sectional view of the delivery valve assembly according to a second embodiment.

Now, in the embodiment shown in FIG. 7 (the second embodiment), the coupling point 73 of the coupling achieved by the coupling members 70 is located at the same position as in the first embodiment, i.e., a position at which insertion into the mounting groove 13 is possible. Furthermore, in this embodiment, the valve stopper 40a is constituted with a fixing portion 42a that clamps and fixes the roll valve 30a over the range starting from the coupling point 73 and going beyond the apex of the valve holder 30a up to the lift supporting point 74, and lift restricting portions 41a, which extend out from the fixing portion 42a to the position at which the delivery holes 31 open from the lift supporting point 74. The length of the arc of the bent surface of the valve stopper 40a is set larger than the length of the arc of the bent surface of the valve stopper 40 in the first embodiment. Likewise, the length of the bend of the roll valve 30a is set larger than the length of the bend of the roll valve 30 in the first embodiment.

Thus, since the force applied to the valve stopper 40 by the delivery pressure is applied toward the apex of the valve holder 30 and is not applied to the coupling point 73 directly, the service life of the delivery valve assembly 20 can be lengthened. In addition, since the length of the valve portions of the roll valve 50a (from the lift supporting point 74 to the position at which the delivery holes 31a are closed) can be increased, the stress at the valve portions is reduced in contrast to the first embodiment. In the first embodiment explained earlier, since the length from the valve supporting point 72 to the position at which the delivery holes 31 are closed is small, the stress is high, which means that, although good response is achieved, if the stress becomes higher than necessary, problems such as inconsistent delivery pressure and damage to the internal surface of the valve holder may occur. In order to address these problems in the second embodiment, the delivery valve structure is constructed so as to ensure that a sufficient length can be obtained for the valve portions so that the stress can be reduced to an absolute minimum necessary.

In addition, in the delivery valve structure in the second embodiment, the gap 32a, i.e., the two ends of the valve holder 30a which face opposite each other, is located on the opposite side from the gap 32, i.e., the two ends of the valve holder 30 which face opposite each other in the first embodiment, while still having a gap for applying stress as in the case of the gap 32 in the first embodiment. Furthermore, the valve holder 30a includes coupling portion retaining seats 35, which project outward in a cylindrical shape from the circumferential edge of the through holes 34a. These coupling member retaining seats 35 may be formed through pressure molding, for instance, and when the delivery valve assembly in the second embodiment is mounted within the valve insertion space 12, these coupling member retaining seats 35 come in contact with the mounting groove 13, making it possible to reinforce the holding strength against self-rotation torque of the delivery valve assembly 20.

Figure 8A:
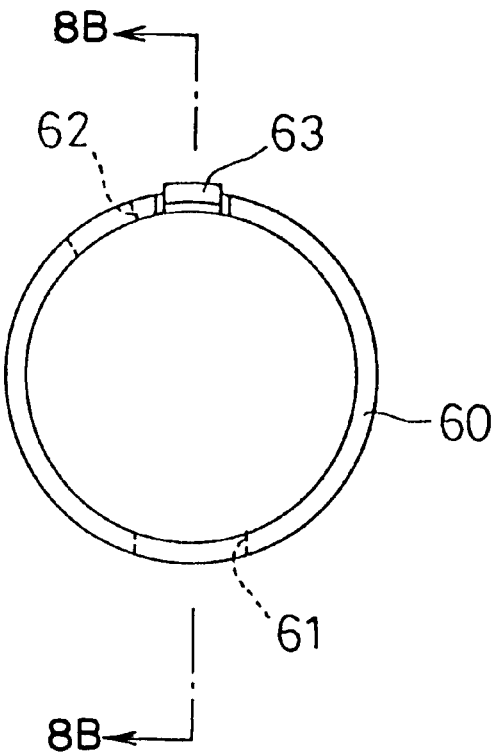
FIG. 8A is a side elevation of the valve holder according to a third embodiment and FIG. 8B is its cross sectional view taken along line 8B—8B in FIG. 8A.
Figure 8B:
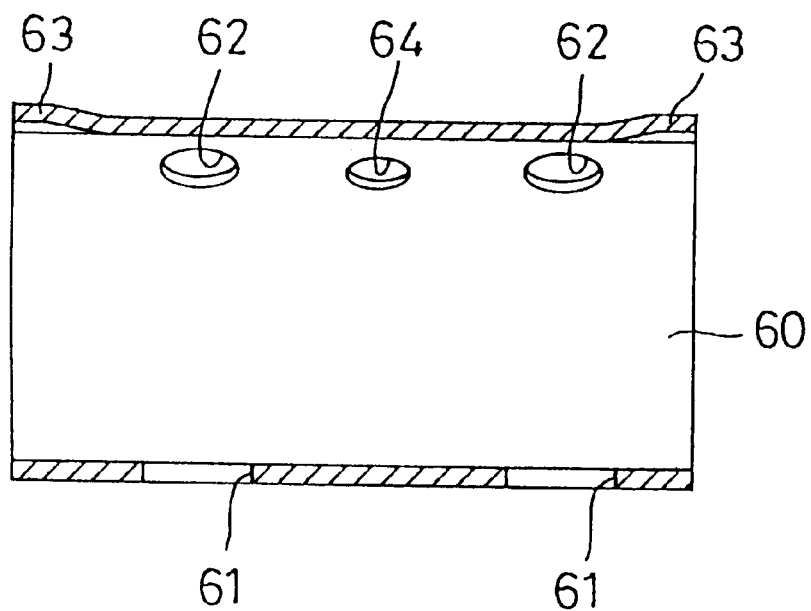

A valve holder 60 in a third embodiment, which is shown in FIGS. 8A and 8B is formed so as to have a cylindrical shape, unlike the earlier-described valve holders 30 and 30a. The valve holder 60 does not have either of the gaps 32 or 32a between the two ends where they face opposite each other for creating stress. This valve holder 60 is formed slightly smaller than the valve insertion space 12. Retaining portions 63, which are formed by being cut and raised toward the outside in the direction of the radius, are formed in areas of the valve holder 60 that face opposite the delivery holes 61. Thus, when mounted in the valve insertion space 12, a force is applied by the retaining portions 63 to the internal surface of the valve insertion space 12 to press the valve holder 60 toward the delivery ports 11 so that the delivery valve assembly can be held within the valve insertion space 12.

As has been explained, according to the present invention, by mounting in the valve insertion space the delivery valve assembly in which the roll valve and the delivery holes that are opened/closed by the roll valve are formed in an integrated manner, when the roll valve is replaced, the valve seat surface is also replaced. This makes it possible to set the seating characteristics of the delivery valve in the initial state, thereby stabilizing the seating characteristics of the valve. In addition, by mounting the delivery valve assembly in the valve insertion space, mounting and dismounting the delivery valve assembly is facilitated, which, in turn, improves the efficiency of the assembly work.

Moreover, positioning alignment of the delivery valve assembly is achieved and self-rotation of the delivery valve assembly is prevented by using the projected portions of the coupling members. Also mountability of the delivery valve assembly is improved and, at the same time, an improvement in the function of the delivery valve is achieved.

Furthermore, with projections of a specific height (coupling member retaining seats) formed at the mounting portion of the coupling members, the holding force against self-rotation imparted by the projected portions of the coupling members is strengthened.

What is claimed is:

1. A delivery valve assembly mountable in a cylindrical valve insertion space formed in a cylinder block of a compressor, the cylinder block defines a compression space and includes delivery ports communicating between the compression space and the cylindrical valve insertion space which has a central axis running perpendicular to a delivery direction of the delivery ports, said delivery valve assembly comprising:

a valve holder having a cylindrical shape which is smaller, in a radial direction thereof, relative to the valve insertion space,
  said valve holder further having a plurality of delivery holes for communicating with the delivery ports, and retaining portions for contacting an inner surface of the valve insertion space, said retaining portions being cut and raised in the radial direction at both ends, in the axial direction, of said valve holder, wherein said retaining portions are formed in areas located opposite from said delivery holes;

a roll valve provided along an internal circumferential surface of said valve holder for opening and closing said delivery holes of said valve holder;

a valve stopper comprising a fixing portion and lift restricting portions, wherein said fixing portion is bent in approximately the same shape as said internal circumferential surface of said valve holder so that said roll valve is clamped and fixed between said valve holder and said fixing portion of said valve stopper,
  wherein said lift restricting portions extend from said fixing portion at positions so that said lift restricting portions oppose said delivery holes and are spaced therefrom by a specific distance in order to restrict the amount of lift of said roll valve; and coupling members fixing said valve holder, said roll valve and said valve stopper in a specific position.

2. A delivery valve assembly as claimed in claim 1, wherein said valve holder is formed by rolling a plate into a cylindrical shape so that said valve holder can be secured in the valve insertion space due to a restoring force of said plate.

3. A delivery valve assembly as claimed in claim 2, wherein:

a lift supporting point is defined by a lift start point of said roll valve;

a coupling point is defined by said coupling members which fix said valve holder, said roll valve and said valve stopper; and said lift supporting point and said coupling point are located on different sides relative to a portion of said valve holder which faces opposite said delivery holes of said valve holder in a radial direction perpendicular to the central axis.

4. A delivery valve assembly as claimed in claim 1, wherein:

a lift supporting point is defined by a lift start point of said roll valve;

a coupling point is defined by said coupling members which fix said valve holder, said roll valve and said valve stopper; and said lift supporting point and said coupling point are located on different sides relative to a portion of said valve holder which faces opposite said delivery holes of said valve holder in a radial direction perpendicular to the central axis.

5. A delivery valve assembly as claimed in claim 1, wherein said coupling members are screws.

6. A delivery valve assembly mountable in a cylindrical valve insertion space formed in a cylinder block of a compressor, the cylinder block defines a compression space and includes delivery ports communicating between the compression space and the cylindrical valve insertion space which has a central axis running perpendicular to a delivery direction of the delivery ports, said delivery valve assembly comprising:

- a valve holder having a cylindrical shape to achieve contact with an internal circumferential surface of the valve insertion space, said valve holder including a plurality of delivery holes for communicating with the delivery ports;
- a roll valve provided along an internal circumferential surface of said valve holder for opening and closing said delivery holes of said valve holder;
- a valve stopper comprising a fixing portion and lift restricting portions, wherein said fixing portion is bent in approximately the same shape within a specific range of said internal circumferential surface of said valve holder such that said roll valve is clamped and fixed between said valve holder and said fixing portion of said valve stopper,
  wherein said lift restricting portions extend from said fixing portion at positions so that said lift restricting portions oppose said delivery holes and are spaced therefrom by a specific distance in order to restrict the amount of lift of said roll valve;
- coupling members extending into through holes in said valve holder and fixing said valve holder, said roll valve and said valve stopper in a specific position; and
- coupling member retaining seats formed at circumferential edges of said through holes, wherein each of said coupling members has a cylindrical shape and projects outwardly from said valve holder.

7. A delivery valve assembly as claimed in claim 6, wherein:

- a lift supporting point is defined by a lift start point of said roll valve;
- a coupling point is defined by said coupling members which fix said valve holder, said roll valve and said valve stopper; and
  said lift supporting point and said coupling point are located on different sides relative to a portion of said valve holder which faces opposite said delivery holes of said valve holder in a radial direction perpendicular to the central axis.

8. A delivery valve assembly as claimed in claim 6, wherein said coupling members are screws.

9. A delivery valve assembly mountable in a cylindrical valve insertion space formed in a cylinder block of a compressor, the cylinder block defines a compression space and includes delivery ports communicating between the compression space and the cylindrical valve insertion space which has a central axis running perpendicular to a delivery direction of the delivery ports, said delivery valve assembly comprising:

- a valve holder formed by rolling a plate into a cylindrical shape so as to achieve contact with an internal circumferential surface of the valve insertion space, said valve holder including a plurality of delivery holes for communicating with the delivery ports;
- a roll valve provided along an internal circumferential surface of said valve holder for opening and closing said delivery holes of said valve holder;
- a valve stopper comprising a fixing portion and lift restricting portions, wherein said fixing portion is bent in approximately the same shape within a specific range of said internal circumferential surface of said valve holder such that said roll valve is clamped and fixed between said valve holder and said fixing portion of said valve stopper,
  wherein said lift restricting portions extend from said fixing portion at positions so that said lift restricting portions oppose said delivery holes and are spaced therefrom by a specific distance in order to restrict the amount of lift of said roll valve;
- coupling members extending into through holes in said valve holder and fixing said valve holder, said roll valve and said valve stopper in a specific position; and
- coupling member retaining seats formed at circumferential edges of said through holes, wherein each of said coupling members has a cylindrical shape and projects outwardly from said valve holder.

10. A delivery valve assembly as claimed in claim 9, wherein:

- a lift supporting point is defined by a lift start point of said roll valve;
- a coupling point is defined by said coupling members which fix said valve holder, said roll valve and said valve stopper; and
  said lift supporting point and said coupling point are located on different sides relative to a portion of said valve holder which faces opposite said delivery holes of said valve holder in a radial direction extending perpendicular to the central axis.

11. A delivery valve assembly as claimed in claim 9, wherein said coupling members are screws.

12. A delivery valve assembly mountable in a cylindrical valve insertion space formed in a cylinder block of a compressor, the cylinder block defines a compression space and includes delivery ports communicating between the compression space and the cylindrical valve insertion space which has a central axis running perpendicular to a delivery direction of the delivery ports, said delivery valve assembly comprising:

- a valve holder formed in a cylindrical shape to contact with an internal circumferential surface of the cylinder block forming the valve insertion space, said valve holder including a plurality of delivery holes for communicating with the delivery ports;
- a roll valve provided along an internal circumferential surface of said valve holder for opening and closing said delivery holes of said valve holder;
- a valve stopper comprising a fixing portion and lift restricting portions, wherein said fixing portion is bent in approximately the same shape within a specific range of said internal circumferential surface of said valve holder such that said roll valve is clamped and fixed between said valve holder and said fixing portion of said valve stopper,
  wherein said lift restricting portions extend from said fixing portion at positions so that said lift restricting portions oppose said delivery holes and are spaced therefrom by a specific distance in order to restrict the amount of lift of said roll valve; and
- coupling members fixing said valve holder, said roll valve and said valve stopper in a specific position,
  wherein said coupling members extend radially outwardly of an external circumferential surface of said valve holder so as to define projecting portions which are adapted to be received in a mounting groove formed in an inner surface of the cylinder block for holding said delivery valve assembly in a specific circumferential orientation relative to the cylinder block.

13. A delivery valve assembly as claimed in claim 12, wherein said valve holder is formed by rolling a plate into a cylindrical shape which can be secured in said valve insertion space by a restoring force of said plate.

14. A delivery valve assembly as claimed in claim 12, wherein said cylindrical shape of said valve holder is smaller, in a radial direction thereof, relative to the valve insertion space, and said valve holder has a plurality of retaining portions for contacting an inner surface of the valve insertion space, said retaining portions being cut and raised in the radial direction at both ends, in the axial direction, of said valve holder, wherein said retaining portions are formed in areas located opposite from said delivery holes.

15. A delivery valve assembly as claimed in claim 12, wherein:

a lift supporting point is defined by a lift start point of said roll valve;

a coupling point is defined by said coupling members which fix said valve holder, said roll valve and said valve stopper; and said lift supporting point and said coupling point are located on different sides relative to a portion of said valve holder which faces opposite said delivery holes of said valve holder in a radial direction extending perpendicular to the central axis.

16. A delivery valve assembly as claimed in claim 12, further comprising coupling member retaining seats formed at circumferential edges of said through holes, wherein each of said coupling members has a cylindrical shape and projects outwardly from said valve holder.

17. A delivery valve assembly as claimed in claim 16, wherein said coupling members are screws having screw threads, and said projecting portions are defined by said screw heads.

18. A delivery valve assembly as claimed in claim 12, wherein said coupling members are screws having screw heads, and said projecting portions are defined by said screw heads.

* * * * *